(12) United States Patent
Gottschalk et al.

(10) Patent No.: US 9,080,546 B2
(45) Date of Patent: Jul. 14, 2015

(54) METHOD FOR CYLINDER EQUALIZATION IN A MULTI-CYLINDER INTERNAL COMBUSTION ENGINE

(75) Inventors: Wolfram Gottschalk, Magdeburg (DE); Olaf Magnor, Braunschweig (DE); Matthias Schultalbers, Meinersen (DE); Christian Steinbrecher, Wismar (DE)

(73) Assignee: IAV GMBH INGENIEURGESELLSCHAFT AUTO UND VERKEHR, Berlin (DE)

( * ) Notice: Subject to any disclaimer, the term of this patent is extended or adjusted under 35 U.S.C. 154(b) by 752 days.

(21) Appl. No.: 13/396,800

(22) Filed: Feb. 15, 2012

(65) Prior Publication Data

US 2012/0204830 A1 Aug. 16, 2012

(30) Foreign Application Priority Data

Feb. 16, 2011 (DE) .......................... 10 2011 011 337

(51) Int. Cl.
| | | |
|---|---|---|
| *F02B 3/00* | (2006.01) | |
| *F02P 5/15* | (2006.01) | |
| *F02D 35/02* | (2006.01) | |
| *F02D 41/00* | (2006.01) | |
| *F02D 41/14* | (2006.01) | |

(52) U.S. Cl.
CPC ............. *F02P 5/1512* (2013.01); *F02D 35/028* (2013.01); *F02D 41/0085* (2013.01); *F02D 41/1441* (2013.01); *F02D 41/1497* (2013.01); *F02D 2200/0602* (2013.01); *F02D 2250/28* (2013.01); *Y02T 10/46* (2013.01)

(58) Field of Classification Search
CPC ....... F02P 5/1512; Y02T 10/40; Y02T 10/42; Y02T 10/44; Y02T 10/46; Y02T 10/47; F02D 2200/06; F02D 2200/0602; F02D 2200/0604
USPC .......................................................... 123/294
See application file for complete search history.

(56) References Cited

U.S. PATENT DOCUMENTS

| | | | | |
|---|---|---|---|---|
| 4,867,124 | A * | 9/1989 | Javaherian | 123/406.41 |
| 5,377,654 | A * | 1/1995 | LoRusso et al. | 123/673 |
| 5,419,301 | A * | 5/1995 | Schechter | 123/673 |
| 5,566,071 | A * | 10/1996 | Akazaki et al. | 701/103 |
| 5,613,480 | A * | 3/1997 | Katoh et al. | 123/673 |
| 5,887,570 | A * | 3/1999 | Suzuki et al. | 123/406.44 |
| 6,694,960 | B2 * | 2/2004 | Hess et al. | 123/673 |
| 6,837,231 | B1 * | 1/2005 | Herrin | 123/684 |
| 6,854,264 | B2 * | 2/2005 | Elwart et al. | 60/285 |

(Continued)

FOREIGN PATENT DOCUMENTS

| | | |
|---|---|---|
| DE | 4236008 A1 | 4/1994 |
| DE | 19511320 A1 | 10/1995 |

(Continued)

*Primary Examiner* — Hieu T Vo
*Assistant Examiner* — Arnold Castro
(74) *Attorney, Agent, or Firm* — Leydig, Voit & Mayer, Ltd.

(57) ABSTRACT

A method is provided for equalizing the cylinders of a multi-cylinder internal combustion engine. The internal combustion engine is configured as a reciprocating engine having direct injection and spark ignition. A fuel mass is injected in a cylinder-specific manner, and a cylinder-specific air mass and a cylinder-specific ignition time are each adjustable. An injection amount is equalized, then a charge is equalized and then a mean combustion pressure is equalized.

8 Claims, 2 Drawing Sheets

(56) References Cited

U.S. PATENT DOCUMENTS

| | | | |
|---|---|---|---|
| 6,966,286 B2 * | 11/2005 | Grau | 123/90.15 |
| 7,073,493 B2 * | 7/2006 | Nakasaka et al. | 123/673 |
| 7,128,051 B2 * | 10/2006 | Nogi et al. | 123/336 |
| 7,159,547 B2 * | 1/2007 | Nakasaka et al. | 123/90.15 |
| 7,287,515 B2 * | 10/2007 | Okamura et al. | 123/494 |
| 7,337,762 B2 * | 3/2008 | Eng et al. | 123/295 |
| 7,654,248 B2 * | 2/2010 | Buslepp et al. | 123/436 |
| 2002/0177933 A1 | 11/2002 | Otterbach et al. | |
| 2003/0000488 A1 * | 1/2003 | Burgdorf et al. | 123/90.13 |
| 2003/0047166 A1 * | 3/2003 | Hess et al. | 123/436 |
| 2004/0007213 A1 * | 1/2004 | Oono | 123/495 |
| 2004/0211393 A1 * | 10/2004 | Grau | 123/435 |
| 2005/0056255 A1 * | 3/2005 | Harris et al. | 123/435 |
| 2009/0118977 A1 * | 5/2009 | Whitney et al. | 701/103 |
| 2011/0100327 A1 * | 5/2011 | Nakagawa et al. | 123/445 |
| 2012/0118267 A1 * | 5/2012 | Kang et al. | 123/406.26 |
| 2012/0192833 A1 * | 8/2012 | Hagari et al. | 123/406.35 |

FOREIGN PATENT DOCUMENTS

| | | |
|---|---|---|
| DE | 10064651 A1 | 7/2002 |
| DE | 10163894 A1 | 7/2003 |
| DE | 10259846 B3 | 6/2004 |
| DE | 102006002108 A1 | 7/2006 |
| DE | 102006016145 A1 | 6/2007 |
| DE | 102006022994 A1 | 11/2007 |
| EP | 1250519 A1 | 10/2002 |
| EP | 1448881 A1 | 8/2004 |
| EP | 1169560 B1 | 9/2004 |

* cited by examiner

METHOD FOR CYLINDER EQUALIZATION IN A MULTI-CYLINDER INTERNAL COMBUSTION ENGINE

CROSS REFERENCE TO PRIOR APPLICATIONS

Priority is claimed to German Patent Application No. DE 10 2011 011 337.1, filed Feb. 16, 2011, the entire disclosure of which is incorporated by reference herein.

FIELD

The present invention relates to a method for cylinder equalization in an internal combustion engine.

BACKGROUND

Patent EP 1 169 560 B1 describes the determination of cylinder-specific differences in a control variable of an internal combustion engine. The method makes it possible to detect cylinder-specific charging differences and to equalize them. It is further stated that the differences in the torque contributions of the individual cylinders may stem from the charging differences or the air ratio differences and thus the fuel metering. Cylinder-specific differences are determined by means of cylinder-specific air ratios and cylinder-specific torque contributions. The relationship between torque, charge and air ratio, accordingly combustion oxygen and fuel mass, is set out. A preferred development of the invention is characterised by the equalization of the cylinder-specific air ratios. Alternatively, an equalization of the cylinder-specific injection times is followed by a determination of the cylinder-specific air ratio differences. The cylinder-specific air ratio differences are determined using cylinder-specific lambda probes. Cylinder-specific charging differences are then derived. The charge can be equalized for example by fully variable actuation of the inlet and/or exhaust valves.

Publication DE 101 63 894 A1 describes a method for equalizing an amount of fuel which is injected in a cylinder-specific manner, for example the opening duration and the pressure at the injector being detected.

Patent DE 102 59 846 B3 describes a method for cylinder equalization, a throttled operation and a dethrottled operation using variable valve trains being provided. The injection amount is equalized during throttled operation of the internal combustion engine. The charge is then equalized during dethrottled operation.

Patent EP 1 448 881 B1 describes a method for equalizing the charge, in which method charge-dependent engine data are detected via sensors while the motor is running. The lift of the inlet valve is adjusted in accordance with this data in order to achieve the setpoint values for the equalization of the charge of the cylinders. Rotational non-uniformity, a lambda value in conjunction with injection parameters or knocking sensor signals are also listed as relevant engine data.

SUMMARY OF THE INVENTION

In an embodiment, the present invention provides a method for equalizing the cylinders of a multi-cylinder internal combustion engine. The internal combustion engine is configured as a reciprocating engine having direct injection and spark ignition. A fuel mass is injected in a cylinder-specific manner, and a cylinder-specific air mass and a cylinder-specific ignition time are each adjustable. An injection amount is equalized, then a charge is equalized and then a mean combustion pressure is equalized.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
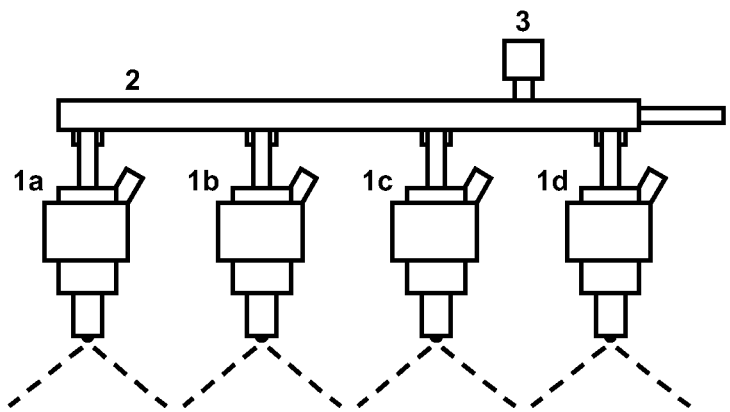
FIG. 1 is a schematic view of the arrangement of a pressure sensor at a fuel supply line having corresponding injectors.

An embodiment of the invention provides a method by which an internal combustion engine can be operated more efficiently.

In an embodiment, the invention provides a method by which an internal combustion engine can be operated closer to the thermodynamic limits, so as to improve the efficiency of the internal combustion engine. The method relates to internal combustion engines which have control options with which at least an unburnt gas mass and an unburnt gas quality, in other words an air mass and a fuel mass, can be adjusted independently of one another. As a result, the amount and the ratio of air mass and fuel mass can be adjusted in a variable manner. Options for adjusting the ignition time, the injection time and exhaust gas recirculation are also advantageously to be provided. The internal combustion engine accordingly at least has options for cylinder-specific adjustment of the air mass and the injected fuel mass. As used herein, cylinder-specific is to be understood as relating to a particular cylinder. In order to minimise or even eliminate the cylinder-specific differences in the internal combustion of internal combustion engines, so as to achieve increased operational reliability of the combustion and to operate the internal combustion engine closer to the thermodynamic limits, the method comprises at least the following method steps:

injection amount equalization,
charge equalization and
mean combustion pressure equalization.

In this case, equalization is to be understood to the effect that there are no or only small cylinder-specific differences with regard to injection amount, charge and finally mean combustion pressure. In an embodiment, the cylinder-specific differences in the injection amount, in other words the injected fuel mass, can be determined by means of the cylinder-specific injection times and pressure ratios at the injector. For example, a high-resolution pressure sensor can be used for this purpose. The pressure signal is then used to calculate the cylinder-specific injection time and the cylinder-specific injection amount. The fuel mass injected in a cylinder-specific manner can then be equalized, for example by correcting the injection time. It is also possible to correct the injection pressure and adapt the needle stroke of the injector if the corresponding injector is used.

Provided that the injected fuel amount has been equalized, possible cylinder-specific differences may still be caused by the charge. In the case of equalized fuel mass and cylinder-specific charging differences, a cylinder-specific air-fuel ratio difference arises. In an embodiment, the air-fuel ratio is detected by an oxygen sensor. Cylinder-specific oxygen sensors or even a common oxygen sensor for all the cylinders, the signal of which is evaluated in accordance with the operating time differences between the cylinders and the exhaust gas line thereof, can accordingly be used for the detection. The cylinder-specific charging differences and accordingly the air mass differences are deduced from the cylinder-specific differences in the air-fuel ratio. A charge equalization and thus an air-fuel ratio equalization are carried out on the basis of these determined cylinder-specific charging differences. Variable valve trains, the valve lift characteristic of which can be adjusted in a cylinder-specific manner, can be used for the cylinder-specific charge correction. Throttle valves arranged in a cylinder-specific manner or a common throttle valve for all the cylinders which is adapted to the engine speed are also possible for the cylinder-specific throttling. The adaptation of the common throttle valve to the engine speed makes it possible to adapt the air mass in each cylinder and thus the charge in a cylinder-specific manner.

Provided that the fuel mass and the charge have been equalized, air-fuel ratio equalization also occurs. Each cylinder of the multi-cylinder internal combustion engine now contains the same mass and quality of an unburnt gas, in other words a combustible air-fuel mixture.

In an embodiment, by subsequently adapting the time of ignition of the combustible air-fuel mixture and thus the position of the centre of combustion, the cylinder-specific mean combustion pressure can also be equalized. Time of ignition is understood to mean an ignition time which relates to a fixed angle mark, for example the top dead centre between the compression stroke and power stroke. By changing the position of the centre of combustion in a cylinder-specific manner with the aim of equalizing the mean combustion pressure, the maximum efficiency of the internal combustion engine is achieved. The cylinder-specific mean combustion pressure can for example be detected via a rotational non-uniformity by means of an engine speed signal or cylinder-specific pressure sensors.

The multi-cylinder internal combustion engine equalized according to this method is characterised by particularly smooth operation. The equalization of the internal combustion engine also provides the option of optimising efficiency, since the internal combustion engine as a whole can be operated closer to the thermodynamic process limits. In conventional internal combustion engines, the limit is already reached when one cylinder has reached the thermodynamic process limits, even though the other cylinders would still offer potential for optimisation. The equalized internal combustion engine can be operated using all cylinders simultaneously up to the thermodynamic process limits.

As a result the efficiency of the internal combustion engine is increased compared to conventional internal combustion engines. The equalization of the cylinders also results in further options for improving the efficiency.

Provided that the cylinders of an internal combustion engine have been equalized, the influence of exhaust gas recirculation on combustion can for example be analysed. For example, for this purpose external exhaust gas recirculation is provided via an exhaust gas recirculation valve and actuated in a defined manner. Internal exhaust gas recirculation by means of suitable valve timings is also possible. This advantageous development of the method according to the invention makes it possible to determine the influence of exhaust gas recirculation on combustion in a precise, cylinder-specific manner. For example, if a variable valve train is used for the exhaust valves, a cylinder-specific adaptation of the recirculated amount of exhaust gas is possible and leads to an optimisation of the efficiency in the corresponding load region compared to conventional internal combustion engines.

Via long-term monitoring of the adjustment setting of a variable valve train, which for example can be adjusted for carrying out the method, it is possible to draw conclusions about the wear of the adjustment mechanism of the valve train or the state of the lubricant quality. Measures for actuating the valve train in order to achieve uniform results can be taken in accordance with the conclusions regarding wear and lubricant quality.

Figure 2:
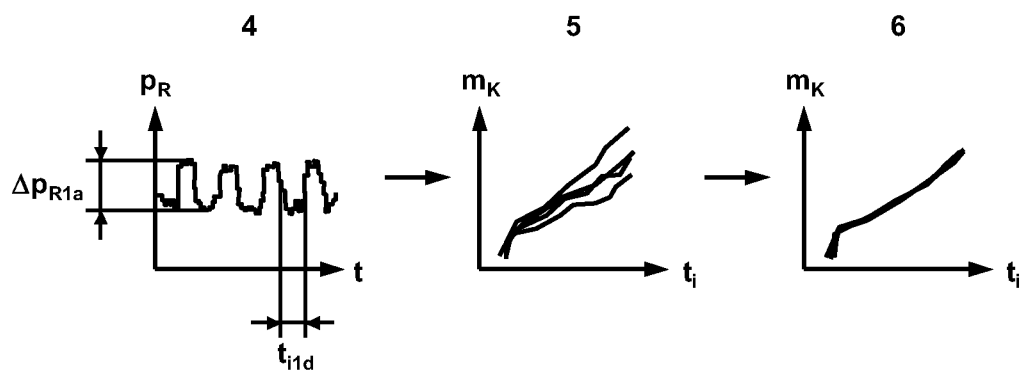
FIG. 2 is a schematic view of the injection amount equalization.

In an embodiment, a preferred configuration of the method according to the invention is described. In this case, the starting point is a reciprocating engine having direct injection and spark ignition, in other words a spark ignition engine, which has a fully variable valve train at least of the inlet valves. FIG. 1 shows the injectors $1a$, $1b$, $1c$, $1d$ required for the direct injection. The injectors $1a$, $1b$, $1c$, $1d$ are connected to a common fuel supply, a so-called fuel rail 2. A pressure sensor 3 which can emit a high-resolution pressure signal $P_R$ of the pressure in the fuel rail 2, as shown in Graph 4 in FIG. 2, is arranged on the fuel rail 2. On the basis of this pressure signal $P_R$ and the trend thereof with respect to time, the actual injection time $L_{i1d}$ and the pressure drop $\Delta P_{R1a}$ caused by the injection, starting from a normal pressure in the fuel rail 2, and thus the injection pressure and the actual injection rate of the respective injector $1a$, $1b$, $1c$, $1d$ can be determined. The injection rate is defined as the injected fuel mass per unit time. The actual cylinder-specific injection rate gives rise to the fuel mass $m_K$, which is injected in a cylinder-specific manner, as a function of the injection time $t_i$, as shown in Graph 5 in FIG. 2. In this case, the pressure drop $\Delta P_{R1a}$ in the fuel rail 2 during a cylinder-specific injection is a measure of the actual injection rate and the duration of the pressure drop $\Delta P_{R1a}$ using predetermined pressure threshold values is a measure of the actual injection time $t_{i1d}$.

The injection amount equalization, in other words the equalization of the injected fuel mass $m_K$, takes place by means of a cylinder-specific correction of the injection times of the respective injectors $1a$, $1b$, $1c$, $1d$. The correction is determined on the basis of the cylinder-specific deviations of the actual injection rate. The correction may be an additive addition, but may preferably be a cylinder-specific correction factor to the setpoint injection time which is preset by a control device. Cylinder-specific differences thus arise between the injection time and the setpoint injection time, which, however, results in an equalization of the injected fuel mass $m_K$, as shown in Graph 6 of FIG. 2, despite different injection rates and injection times.

Figure 3:
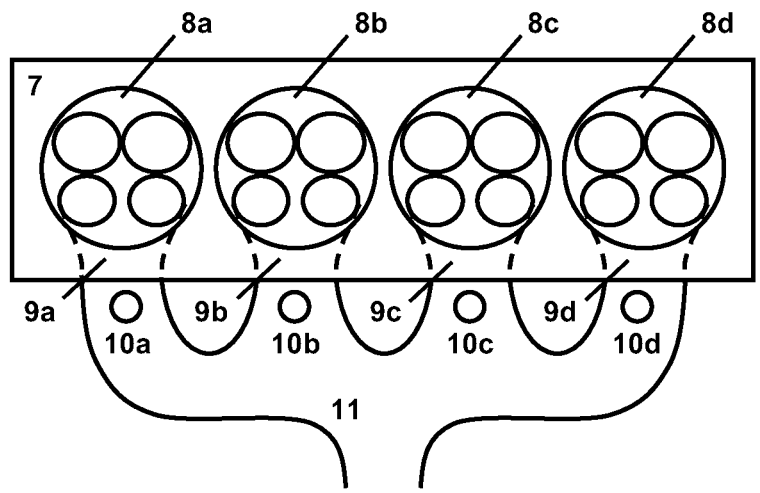
FIG. 3 is a schematic view of the arrangement of the oxygen sensors at an exhaust manifold.
Figure 4:
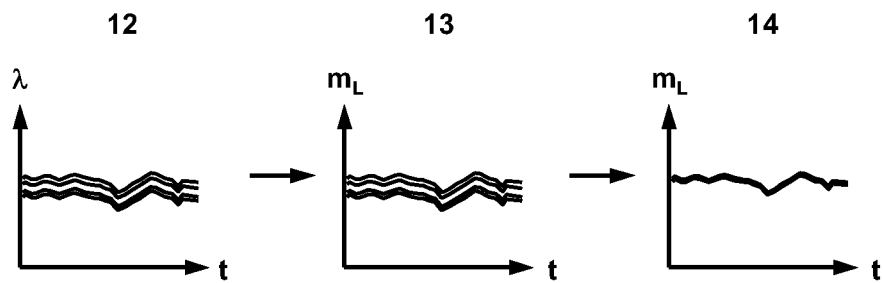
FIG. 4 is a schematic view of the charge equalization.

Provided that the injection amount has been equalized, in a subsequent step the proportion of the air mass $m_L$ in the unburnt gas charge can be detected by detecting the air-fuel ratio $\lambda$ in a cylinder-specific manner (FIG. 3 and FIG. 4). For this purpose, cylinder-specific oxygen sensors $10a$, $10b$, $10c$, $10d$ are used, the measuring signal of which allows conclusions to be drawn about the air-fuel ratio $\lambda$. For this purpose, the oxygen sensors are arranged for example in an exhaust manifold 11 in the region of the cylinder-specific exhaust port $9a$, $9b$, $9c$, $9d$ of the respective cylinder $8a$, $8b$, $8c$, $8d$ of a multi-cylinder internal combustion engine 7. The cylinder-specific differences in the air-fuel ratio $\lambda$ are caused by a charging difference in the air mass $m_L$ of the respective cylinder, as shown in Graph 12 and Graph 13 in FIG. 4. In order to equalize this cylinder-specific charging difference in the air mass $m_L$, the lift characteristic of the inlet valves is advantageously modified via a fully variable valve train. For this purpose, the timings and the valve lift can be adapted. For example, the maximum inlet valve lift is accordingly adjusted in a cylinder-specific manner, in such a way that each cylinder has the same air mass $m_L$, as shown in Graph 14 in FIG. 4. For example, a reduction of the maximum inlet valve lift causes a reduction of the charge. This results in an equalization of the cylinders, the same fuel mass $m_K$ and the same air mass $m_L$ being located in each cylinder and the same air-fuel ratios thus being set.

Figure 5:
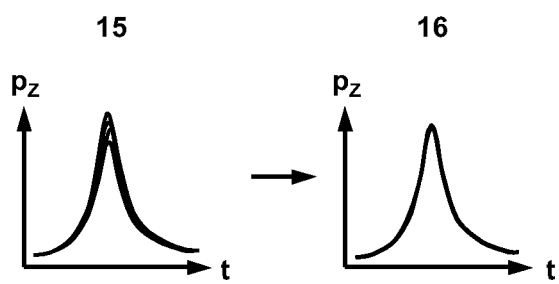
FIG. 5 is a schematic view of the mean combustion pressure equalization and FIG. 6 is a schematic view of the influence of exhaust gas recirculation.

Provided that the charge has been equalized, the mean combustion pressure can then be equalized in a subsequent step. The cylinder-specific differences in the combustion pressure $P_Z$ in the cylinder and accordingly the pressure curve, as shown in Graph 15 in FIG. 5, are caused for example by cylinder-specific carburation processes, wall heat losses, combustion delays and so on. To equalize the mean combustion pressure, the ignition time is for example varied until the mean pressure is equalized. By varying the ignition time the position of the centre of combustion can be adapted in such a way that each cylinder contributes the same mean combustion pressure and thus the same torque to the total torque of the internal combustion engine. A mean combustion pressure equalization is often accompanied by an equalization of the pressure curve of the combustion pressure $P_Z$, see Graph 16 in FIG. 5. The torque contribution of the respective cylinder can take place by evaluating an engine speed signal in a cylinder-specific manner. For this purpose, the engine speed is detected for example at the crankshaft of the internal combustion engine and evaluated with regard to rotational non-uniformity. If each cylinder causes the same rotational non-uniformity during the power stroke of the respective cylinder, the torque contributions of the individual cylinders are also the same.

Figure 6:
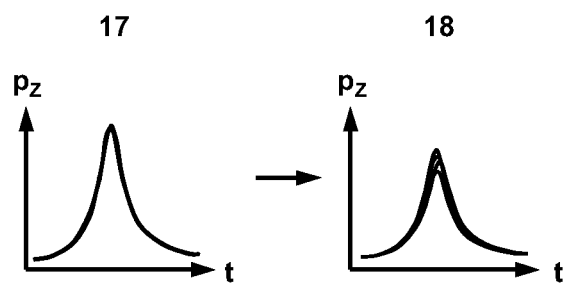

On the basis of the equalized cylinders of the internal combustion engine, according to the advantageous embodiment the cylinder-specific influence on combustion of exhaust gas recirculation for minimising consumption is evaluated. For this purpose external exhaust gas recirculation is activated, an air-fuel mixture which has already been burnt in a preceding power stroke is returned to the fresh air side of the internal combustion engine, for example by pipes, and is supplied to the fresh air as a proportion. The fresh charge of the respective cylinder is replaced in part by exhaust gas. As a result, differences in the pressure curve of the combustion pressure $P_Z$ of the previously equalized internal combustion engine may arise again. Graph 17 of FIG. 6 shows the pressure curve of the combustion pressure $P_Z$ of the equalized internal combustion engine without exhaust gas recirculation. Graph 18 in FIG. 6 shows the influence of exhaust gas recirculation on the pressure curve of the combustion pressure $P_Z$. Differences in the pressure curve occur again, which cause the differences in the mean combustion pressure and thus in the torque contribution of the respective cylinder. The influence of the recirculated exhaust gas can then be determined by analysing the engine speed by a known method. From the rotational non-uniformity, for example the cylinder-specific torque contribution and accordingly cylinder-specific differences in the exhaust gas proportions in the total charge can be determined.

To restore smooth operation, various suitable method steps may subsequently be repeated, such as the equalization of the mean combustion pressure by adapting the injection amount in conjunction with the adaptation of the charge to equalize the air-fuel ratio.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

1$a$, 1$b$, 1$c$, 1$d$ injectors
2 fuel rail
3 pressure sensor
4, 5, 6 graph
7 multi-cylinder internal combustion engine
8$a$, 8$b$, 8$c$, 8$d$ cylinder
9$a$, 9$b$, 9$c$, 9$d$ exhaust port
10$a$, 10$b$, 10$c$, 10$d$ oxygen sensor
11 exhaust manifold
12, 13, 14, 15, 16, 17, 18 graph
$\Delta P_{R1a}$ pressure drop
$\lambda$ air-fuel ratio
$m_K$ fuel mass
$m_L$ air mass
$P_R$ pressure signal
$P_Z$ combustion pressure
$t_i$ injection time
$t_{i1d}$ injection time

What is claimed is:

1. A method for equalizing the cylinders of a multi-cylinder internal combustion engine, the internal combustion engine being configured as a reciprocating engine having direct injection and spark ignition, wherein a fuel mass injected in a cylinder-specific manner, a cylinder-specific air mass and a cylinder-specific ignition time are each adjustable, the method comprising:
    equalizing an injection amount; then
    equalizing a charge; and then
    equalizing a mean combustion pressure by setting the cylinder-specific ignition time.

2. The method as recited in claim 1, wherein the equalizing the injection amount includes assessing a cylinder-specific injection rate for a respective injector based on a cylinder-specific fuel pressure.

3. The method as recited in claim 1, wherein the equalizing the injection amount includes correcting at least one of a cylinder-specific injection time, a cylinder-specific injection pressure and a cylinder-specific injection rate of the injector.

4. The method as recited in claim 1, wherein the equalizing the charge is performed using one of a cylinder-specific throttle valve, a fully variable valve train and a throttle valve common to all cylinders and adapted to an engine speed.

5. The method as recited in claim 1, wherein the equalizing the charge is performed by a cylinder-specific adjusting of a valve lift characteristic, including adjusting at least one of an opening time, a closing time, and a valve lift gradient.

6. The method as recited in claim 1, further comprising monitoring, long-term, of an adjustment setting.

7. The method as recited in claim 1, further comprising assessing the equalization of the multi-cylinder internal combustion engine based on at least one of an engine speed, a combustion pressure and a knocking signal.

8. The method as recited in claim 1, further comprising detecting a cylinder-specific difference so as to examine a cylinder-specific influence of exhaust gas recirculation on the equalized multi-cylinder internal combustion engine.

\* \* \* \* \*